May 28, 1968
V. BROWN
3,385,687
COMPOSTING PROCESS
Filed Feb. 21, 1966
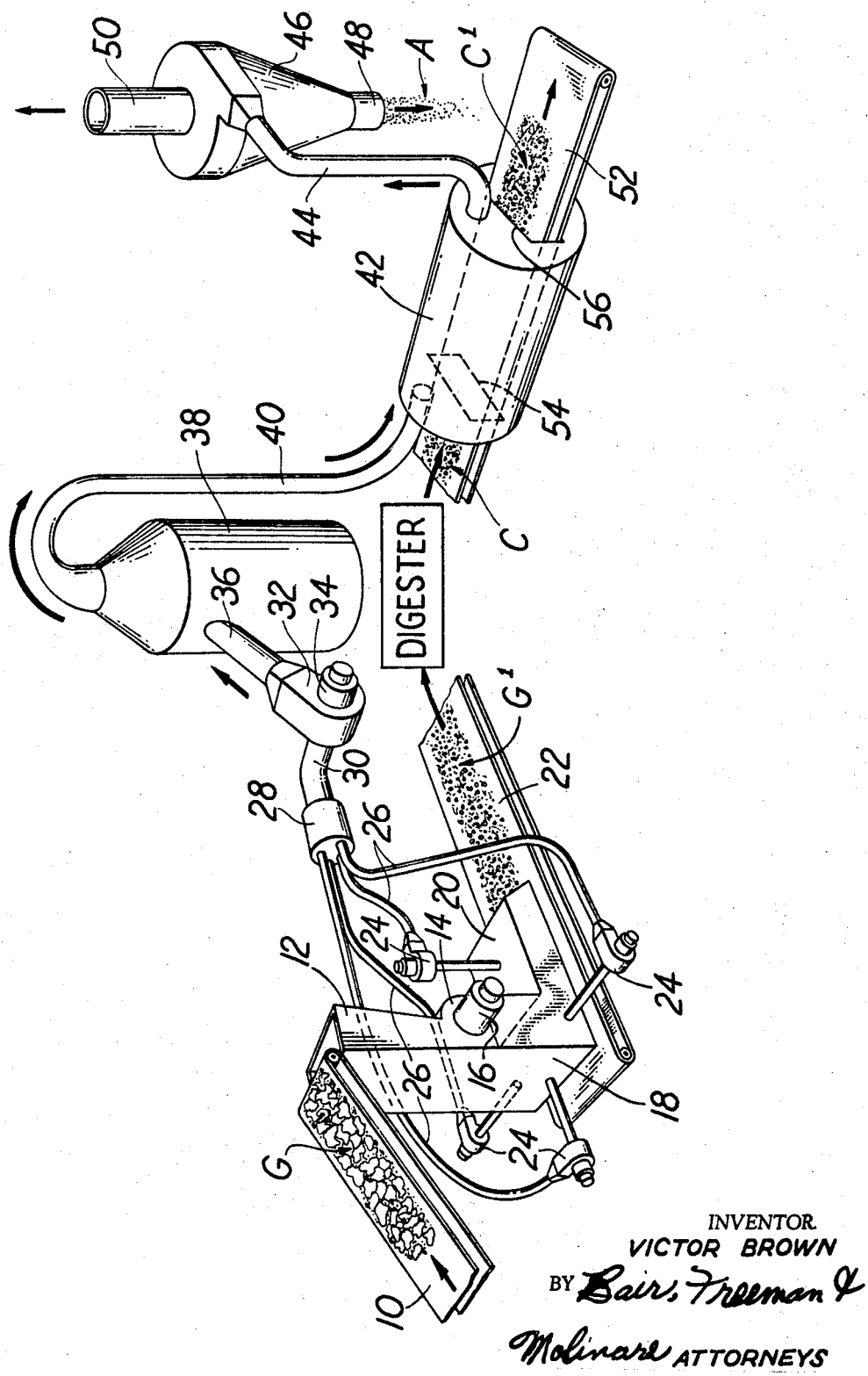
INVENTOR.
VICTOR BROWN
BY Bair, Freeman &
Molinare ATTORNEYS 3,385,687
COMPOSTING PROCESS
Victor Brown, Elmhurst, Ill., assignor to New Life Foundation, a corporation of Illinois
Filed Feb. 21, 1966, Ser. No. 529,127
1 Claim. (Cl. 71—13)

This invention relates to an improved process for composting garbage in order to secure a compost output of relative high quality.

One object of the invention is to provide a process for composting town and house refuse which includes garbage, paper and the like, organic and inorganic wastes, and further steps of comminuting, mixing, aerobically digesting and drying such refuse, the present invention having to do with an improvement in the process which comprises the steps of shredding such paper and the like during the comminuting step to decrease its bulk and density, and the further step of withdrawing a portion of this shredded paper and the like from the comminuted refuse.

Another object is to provide a process in which the withdrawing step is performed by drawing a vacuum on the refuse following the comminuting step.

Still another object is to withdraw from 1% to 25% by weight of the total quantity of shredded paper and the like present in the comminuted mass of refuse.

Still a further object is to provide a process which includes the further steps of entraining the withdrawn portion of the shredded paper in a stream of air and the conveyance thereof to a furnace, the step of burning such entrained shredded paper in the furnace, and the step of using the products of combustion to supply heat for the drying step, thereby composting garbage at relatively low expense.

With these and other objects in view, my invention consists in the steps of my composting process as hereinafter more fully set forth, pointed out in my claim and illustrated in detail on the accompanying drawing, wherein:

The figure is a perspective view of apparatus shown somewhat diagrammatically for practicing my improved composting process.

On the accompanying drawing I have used the reference numeral 10 to indicate a primary garbage conveyor to which garbage is supplied from garbage trucks after relatively large pieces of paper and similar combustible material have been removed therefrom by hand. Usually about 15% of town and house refuse can be removed in this manner and the paper reprocessed at a paper mill.

The remaining garbage usually includes a considerable quantity of smaller pieces of paper, plastic bags and the like, a portion of which is readily combustible and is indicated at G on the conveyor 10. The garbage G falls from the conveyor into a hopper 12 leading to a grinder 14. The grinder 14 is driven by an electric motor 16, or any other suitable source of power, and grinds the garbage G. In so doing it comminutes paper and the like in the garbage, causing it to be shredded whereby its bulk density is decreased so that anywhere from 1% to 25% may be withdrawn by vacuum from a grinder output chamber 18 and a hood 20 arranged over a secondary garbage conveyor 22.

Such vacuum may be created in the chamber 18 and the hood 20 by several vacuum fans 24 suitably driven by electric motors or the like and discharging into primary comminuted paper conduits 26 leading to a manifold 28. From the manifold 28 a secondary comminuted paper conduit 30 leads to a vacuum fan 32 driven by a motor 34 which acts as a booster. The output from the fan 32 passes through a tertiary comminuted paper conduit 36 into a furnace 38 where the paper, etc., is burned.

As for the remaining 75% or more of the paper not picked up by the vacuum action, it is wet and sticky and suitable as a portion of the compost derived from the garbage. The secondary garbage conveyor 22 conveys garbage $G^1$ (the garbage with comminuted paper removed) to a digester (so labeled on the drawing) which may be one of the type disclosed and claimed in my copending applications Ser. No. 357,423, filed Apr. 6, 1964, now Patent No. 3,294,491 and Ser. No. 497,035, filed Oct. 18, 1965 now Patent No. 3,323,896.

The digester converts the garbage $G^1$ to compost C which is carried by a compost conveyor 52 through a drier housing 42. The compost which issues from the drier housing is indicated $C^1$ and differs from the compost C in that it is relatively dry.

In the operation of a composting apparatus of the general character herein referred to, economies are effected by utilizing the heat generated in the furnace 38 as the means to dry the compost C. Accordingly, the furnace 38 is provided with a primary conduit 40 for products of combustion leading to the drier housing 42 and a secondary conduit for products of combustion leads therefrom as shown at 44 to a centrifugal separator 46. In the separator 46 ashes A are separated from the remaining products of combustion discharged through an exhaust 50 to atmosphere, the ashes A falling out of an ash outlet 48 by gravity. Thus, the exhaust to atmosphere is relatively clean so as to conform to smoke control ordinances, air pollution ordinances and the like.

The quality of the compost C is improved by removing paper from the garbage G and I find that the apparatus disclosed and the process of operation thereof as herein disclosed effects such quality improvement. The nitrogen-to-carbon ratio of the compost is better than 1:20. A high nitrogen content is desirable and is attained from greens in the garbage, whereas such ratio is reduced if the paper and similar combustibles are left in the garbage.

At certain times of the year the paper content of garbage is greater than at other times. The removal of the desired proportion of paper may be controlled by increasing or decreasing the effectiveness of the vacuum by controlling the speed of the vacuum fans 24 and 32. Quality is controlled not only by the percentage of paper going into the digester, but by removing all light film plastics, the quantity of which is increasing at a rapid rate, and thereby retaining higher residual elements which are nutritional as a compost for agricultural use. The control feature which this system affords is important from a plant operation standpoint in that it will also preclude the production of compost fertilizer being completely dependent and subjective to the content of the incoming waste deliveries. This is important in the production of a uniform and consistent compost product.

As a source of the entire fuel requirement for the drying operation, the economic value of burning the paper, etc., and using the products of its combustion to dry the compost is of major consideration. In those localities where the percentage of paper and other combustible material is high there is more than enough heat for drying the compost and it may accordingly be utilized in other processes such as space heating in Northern climes and for generating heat power for electricity and the like.

The blower arrangement disclosed gives a wide control range for the amount of suction provided at each location of the inlets on the hopper by the use of variable speed motors, and some can be entirely cut off if desired.

From the foregoing specification it will be obvious that I have disclosed an improved composting process which will accomplish the objects contemplated and which is relatively inexpensive to perform by reason of utilizing the withdrawn combustible material as a means for supplying heat to the drier for the compost.

Some changes may be tolerated in the steps of my process without departing from the real spirit and purpose of my invention, and it is my intention to cover by my claim any modification which may reasonably be included within its scope.

I claim as my invention:

1. In a process for composting town and house refuse which contains garbage, paper and the like, organic and inorganic waste, and which process includes the steps of comminuting, mixing, aerobically digesting, and drying such refuse; the improvement which comprises shredding such paper and the like during the comminuting step to decrease its bulk density, creating a vacuum adjacent such shredded paper and the like, thereby withdrawing a portion thereof from said comminuted refuse, entraining said withdrawn portion in a stream of air and conveying it to a furnace, burning said portion in the furnace, and supplying the products of combustion from the furnace to provide heat for said drying step.

References Cited

UNITED STATES PATENTS 3,236,604  2/1966  Pierson _____ 23—259.1

JAMES W. WESTHAVER, *Primary Examiner.*